United States Patent
Monastyrsky et al.

(10) Patent No.: US 9,679,139 B1
(45) Date of Patent: Jun. 13, 2017

(54) SYSTEM AND METHOD OF PERFORMING AN ANTIVIRUS SCAN OF A FILE ON A VIRTUAL MACHINE

(71) Applicant: AO Kaspersky Lab, Moscow (RU)

(72) Inventors: Alexey V. Monastyrsky, Moscow (RU); Vitaly V. Butuzov, Moscow (RU); Maxim Y. Golovkin, Moscow (RU); Dmitry V. Karasovsky, Moscow (RU); Vladislav V. Pintiysky, Moscow (RU); Denis Y. Kobychev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/168,794

(22) Filed: May 31, 2016

(30) Foreign Application Priority Data

Mar. 18, 2016 (RU) ................................ 2016109928

(51) Int. Cl.
*G06F 21/56* (2013.01)
*G06F 17/30* (2006.01)
*G06F 9/455* (2006.01)

(52) U.S. Cl.
CPC ........ *G06F 21/566* (2013.01); *G06F 9/45533* (2013.01); *G06F 17/30477* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,093,239 B1 * | 8/2006 | van der Made | G06F 21/562 714/38.13 |
| 7,779,472 B1 | 8/2010 | Lou | |
| 8,434,151 B1 * | 4/2013 | Franklin | G06F 21/56 713/187 |
| 8,510,838 B1 * | 8/2013 | Sun | G06F 21/53 713/150 |

(Continued)

FOREIGN PATENT DOCUMENTS

EP 2725510 A1 4/2014

OTHER PUBLICATIONS

Kang, "Emulating Emulation-Resistant Malware", 2009, VMSec, pp. 1-12.*
European Search Report for EP 16175085 dated Jan. 16, 2017.

*Primary Examiner* — Benjamin Lanier
(74) *Attorney, Agent, or Firm* — Arent Fox LLP; Michael Fainberg

(57) ABSTRACT

A method and system are provided for performing an antivirus scan of a file on a virtual machine. An example method includes performing a first execution of the file on the virtual machine, recording a first log that includes an API function call and an internal event detected during execution, and determining if any signatures in the log are stored in a signatures database. Moreover, if no signatures in the first log are found in the first database of signatures, the file is classified as not malicious. In contrast, if at least one signature is found, a second execution of the file is perform and a second log is recorded that includes a detected internal event. Moreover, the method includes determining if any signatures in the second log are stored in a second database of signatures; and classifying the file as not malicious if no signatures are found.

21 Claims, 6 Drawing Sheets

(56) References Cited

U.S. PATENT DOCUMENTS

| | | | | |
|---|---|---|---|---|
| 8,555,386 B1* | 10/2013 | Belov | ................... | G06F 21/566 |
| | | | | 726/22 |
| 9,116,621 B1 | 8/2015 | Pintiysky et al. | | |
| 2002/0056076 A1 | 5/2002 | Made | | |
| 2005/0154900 A1* | 7/2005 | Muttik | ................... | G06F 21/55 |
| | | | | 713/188 |
| 2007/0256127 A1* | 11/2007 | Kraemer | ............... | G06F 21/552 |
| | | | | 726/23 |
| 2010/0031353 A1* | 2/2010 | Thomas | .............. | G06F 11/3604 |
| | | | | 726/22 |
| 2011/0314544 A1* | 12/2011 | Shin | ........................ | G06F 21/50 |
| | | | | 726/23 |
| 2012/0174224 A1* | 7/2012 | Thomas | ................ | G06F 21/566 |
| | | | | 726/24 |
| 2015/0082430 A1* | 3/2015 | Sridhara | ............... | G06F 21/566 |
| | | | | 726/23 |
| 2015/0172303 A1* | 6/2015 | Humble | ............. | H04L 63/1408 |
| | | | | 726/23 |
| 2015/0373039 A1* | 12/2015 | Wang | ................. | H04L 63/1425 |
| | | | | 726/23 |

\* cited by examiner

Table 2. Records on suspicious activities

| № | Suspicious activity | Fields | Description | Example |
|---|---|---|---|---|
| 1 | Autorun | • unique process identifier PID<br>• registry_key – name of registry key<br>• Target_file – path to the file which was added to autostart<br>• Image_path – path to the file from which the process performing the action was launched | The process launched from Image_path added the file Target_file to autostart (registry key) | [{"name": "autorun", "Pid": 804, "Image_path": "c:\\downloads\\monster-file.exe", "registry_key": "\\REGISTRY\\USER\\$usersid\\Software\\Microsoft\\Windows\\CurrentVersion\\Run\\evil_key", "Target_file": "$selfname.exe", "description": "file was added for launching during starting of operating system"}] |
| 2 | addedToFirewallList | • Target_file – path to the file which was added<br>• Image_path – path to the file from which the process performing the action was launched | The process Image_path added Target_file to the Windows Firewall permission list. | [{"name": "addedToFirewallList", "Pid": 216, "Image_path": "c:\\WINDOWS\\system32\\netsh.exe", "Target_file": "$selfpath\\$selfname.exe", "severity": 330, "description": "Windows Firewall settings have been changed"}] |
| 3 | create_file_in_system_directory | • Target_file – path to the file created<br>• Image_path – path to the file from which the process performing the action was launched | The process Image_path created Target_file in the system folder. | [{"name": "create_file_in_system_directory", "Pid": 804, "Image_path": "c:\\downloads\\monster-file.exe", "Target_file": "$windir\\$system32\\svch0st.exe", "description": "file was created in system folder"}] |
| 4 | create_service | • service_name – name of service<br>• binary_path – path to the executable service file<br>• Image_path – path to the file from which the process performing the action was launched | The process Image_path created the service_name (path to the executable file: binary_path). | [{"name": "create_service", "Pid": 804, "Image_path": "c:\\downloads\\monster-file.exe", "service_name": "evil_service", "binary_path": "$windir\\$system32\\$selfname.exe", "description": "Microsoft Windows service was created"}] |
| 5 | name_like_system_file | • Target_file – path to the file created<br>• system_name – name of the system file which Target_file resembles<br>• Target_Image_path – path to the file from which the victim process was launched<br>• Image_path – path to the file from which the process performing the action was launched | The process Image_path created the file Target_file with name similar to the system file system_name. | [{"name": "name_like_system_file", "Pid": 804, "Image_path": "c:\\downloads\\monster-file.exe", "Target_file": "$windir\\$system32\\svch0st.exe", "system_name": "svchost.exe", "description": "file created with name similar to system file"}] |
| 6 | self_copy | • Image_path – path to the file from which the process performing the action was launched<br>• Src_path – path to the original file<br>• Dst_path – path to the copied file | The process Image_path copied the file Src_path to Dst_path. | [{"name": "self_copy", "Pid": 1576, "Image_path": "c:\\downloads\\9dec6dfc9a478426a7b11fd805cbeaf6.exe", "Src_path": "$selfpath\\$selfname.exe", "Dst_path": "$user\\$temp\\\\History\\$selfname.exe", "severity": 330, "description": "Executable has copied itself"}] |
| 7 | self_delete | Image_path – path to the file from which the process performing the action was launched Target_file – path to the file on which the action is performed | The process Image_path deleted the executable file Target_path. | [{"name": "self_delete", "Pid": 1600, "Image_path": "c:\\WINDOWS\\system32\\cmd.exe", "Target_path": "$selfpath\\$selfname.exe", "severity": 330, "description": "Executable has deleted another executable"}] |

Fig. 6

SYSTEM AND METHOD OF PERFORMING AN ANTIVIRUS SCAN OF A FILE ON A VIRTUAL MACHINE

CROSS-REFERENCE TO RELATED APPLICATIONS

This application claims benefit of priority under 35 U.S.C. 119(a)-(d) to a Russian Application No. 2016109928 filed on Mar. 18, 2016, both of which are incorporated by reference herein.

FIELD OF TECHNOLOGY

The disclosure herein generally related to antivirus technologies, and more particularly, to systems and methods of performing an antivirus scan of a file on a virtual machine.

BACKGROUND

Traditional signature analysis is not always able to detect a malicious file, especially polymorphic viruses, and also modified versions of a malicious file. Therefore, modern antivirus applications additionally employ a scan using a virtual machine. The file being scanned is executed on the virtual machine. The events occurring as a result of the execution of the process launched from the file are preserved in a log by way of interception of the various routines being executed by both the process and the operating system (OS). The antivirus application then analyzes the resulting log. The log usually saves the calls of API (application programming interface) functions carried out by said process during its execution, and also the returns from API functions that were called (transfer of control by return address). The execution of a file on a virtual machine usually occurs within a limited interval of time (up to several dozen seconds), because the execution of a file on a virtual machine and the interception of API function calls by an antivirus application significantly slow down the file execution speed. At the same time, in order to prevent detection of a malicious file by an antivirus application, hackers have begun to add code to the malicious file, which does not contain any malicious activity, but has cycles with a large number of API functions whose calls require a long time to intercept. Thus, the time devoted to executing the file on a virtual machine elapses even before the start of the execution of the malicious portion of the file code.

SUMMARY

An analysis of the prior art leads to the conclusion that it is not effective, and sometimes even impossible, to use the previous technologies, whose deficiencies are remedied by the present disclosure, namely, a system and method of performing an antivirus scan of a file on a virtual machine.

Thus, according to one aspect, a method includes performing a first execution of the file on the virtual machine; recording, in memory, a first log that includes at least one API function call and at least one internal event detected during the first execution of the file; determining if any signatures in the first log are stored in a first database of signatures; if no signatures in the first log are found in the first database of signatures, classifying the file as not malicious; if at least one signature in the first log is found in the first database of signatures, performing a second execution of the file on the virtual machine and recording, in the memory, a second log that includes at least one internal event detected during the second execution of the file; determining if any signatures in the second log are stored in a second database of signatures; and if no signatures in the second log are found in the second database of signatures, classifying the file as not malicious.

According to another aspect, the method further includes if at least one signature in the second log is found in the second database of signatures, determining criteria to make records on API function calls based on the first log and the second log; performing a third execution of the file on the virtual machine until conditions for the determined criteria are fulfilled; recording, in the memory, a third log that includes at least one internal event detected during the third execution of the file; determining if any signatures in the third log are stored in a database of malicious signatures; and if no signatures in the third log are found in the database of malicious signatures, classifying the file as not malicious.

According to another aspect, the criteria to make records on API function calls comprises at least one of an occurrence of an internal event with a record sequence number in the second log for a record found in the second log before a first record of the identified signature in the second database of signatures, and making of records on API function calls after detection of signatures in the first log and the second log in the second database of signatures.

According to another aspect, the performing of the first execution of the file on the virtual machine comprises performing the first execution for a period of time or until execution of program code of the file is complete.

According to another aspect, the method includes dynamically changing the period of time during the first execution of the file on the virtual machine depending on instructions being executed by the file.

According to another aspect, each of the at least one internal events stored in the first log and the second log includes a name of the internal event, a type of system call, and a unique identifier of a process launched from the file.

According to another aspect, each of the at least one internal events stored in the first log and the second log includes a unique identifier of a thread launched from the process, a unique identifier of the process of an object of an OS kernel addressed by the system call, a unique identifier of a thread of the object of the OS kernel, and a pathway to the object of the OS kernel.

According to one aspect, a system is provided for performing an antivirus scan of a file on a virtual machine. According to this aspect, the system includes a first database of signatures; a second database of signatures; memory; and a processor configured to performing a first execution of the file on the virtual machine, store, in memory, a first log that includes at least one API function call and at least one internal event detected during the first execution of the file, determine if any signatures in the first log are stored in the first database of signatures, if no signatures in the first log are found in the first database of signatures, classify the file as not malicious; if at least one signature in the first log is found in the first database of signatures, perform a second execution of the file on the virtual machine and store, in the memory, a second log that includes at least one internal event detected during the second execution of the file; determine if any signatures in the second log are stored in the second database of signatures; and if no signatures in the second log are found in the second database of signatures, classify the file as not malicious.

According to another aspect, a non-transitory computer readable medium storing computer executable instructions is provided for performing an antivirus scan of a file on a virtual machine. According to this aspect, instructions are provided for performing a first execution of the file on the virtual machine; recording, in memory, a first log that includes at least one API function call and at least one internal event detected during the first execution of the file; determining if any signatures in the first log are stored in a first database of signatures; if no signatures in the first log are found in the first database of signatures, classifying the file as not malicious; if at least one signature in the first log is found in the first database of signatures, performing a second execution of the file on the virtual machine and recording, in the memory, a second log that includes at least one internal event detected during the second execution of the file; determining if any signatures in the second log are stored in a second database of signatures; and if no signatures in the second log are found in the second database of signatures, classifying the file as not malicious.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specifica-tion, illustrate one or more example aspects of the present disclosure and, together with the detailed description, serve to explain their principles and implementations.

FIG. 6 illustrates Table 2, which presents examples of suspicious activities.

DETAILED DESCRIPTION

Example aspects are described herein in the context of a system, method and computer program product for systems and methods of performing an antivirus scan of a file on a virtual machine. The technical result provides for the detection of a malicious file containing program code that impairs the detection of said malicious file when the file is executed on a virtual machine. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
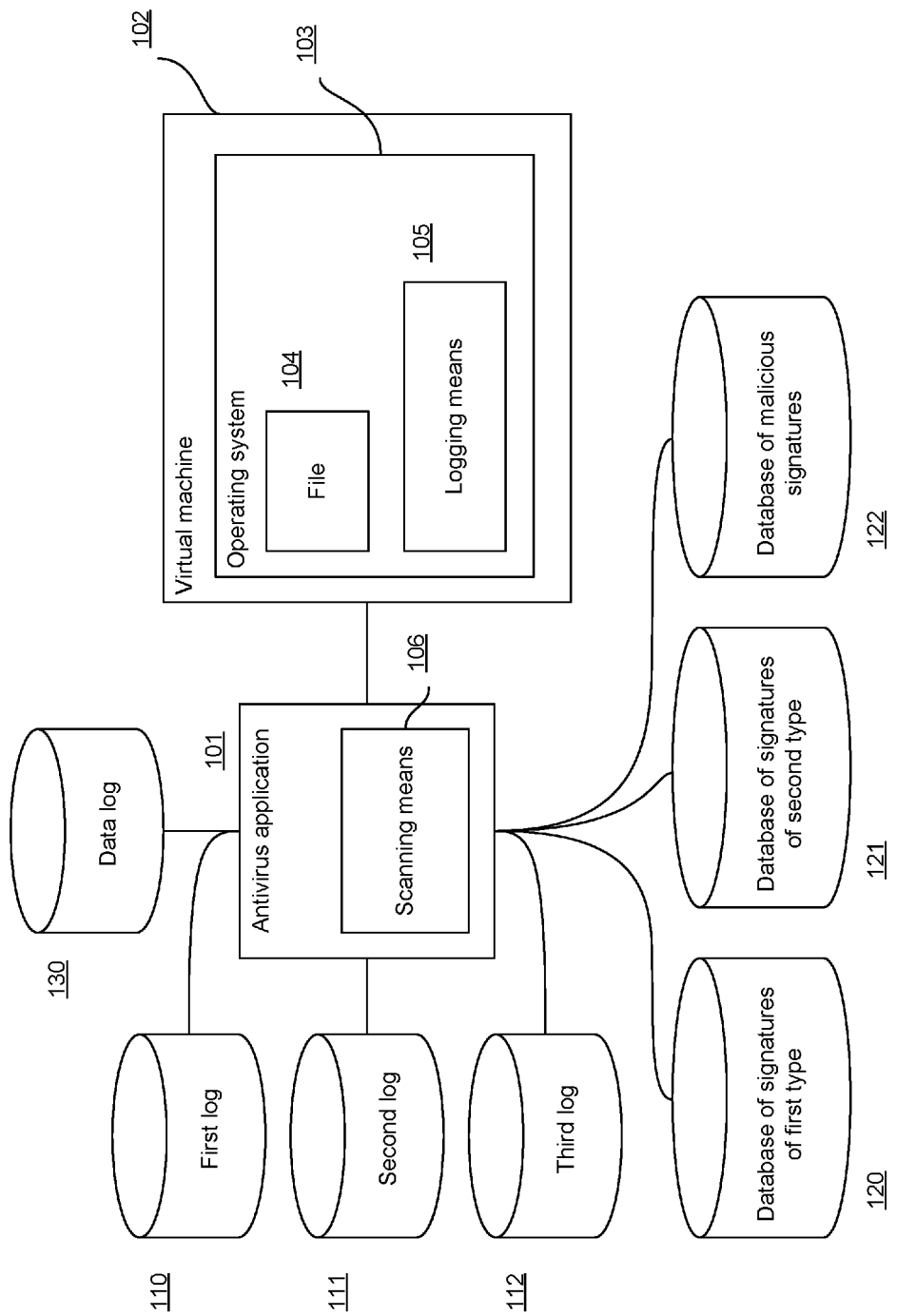
FIG. 1 illustrates a block diagram of a system for performing an antivirus scan of a file on a virtual machine according to an exemplary aspect.

FIG. 1 illustrates a block diagram of a system for performing an antivirus scan of a file on a virtual machine according to an exemplary aspect. As shown, the system includes an antivirus application 101, designed to execute a file 104 on a virtual machine 102. In an exemplary aspect, there is executed on the virtual machine 102 an operating system (OS) 103, in which the execution of the file 104 occurs in turn. During the execution of the file 104 on the virtual machine 102, the logging module 105 connected to the antivirus application 101 enters records (saves them in a log) on API function calls, and also internal events in a first log 110, a second log 111 and a third log 112. The differences between the logs 110-112 will be described in greater detail below.

According to the exemplary aspect, internal events are system calls of the process launched from the file 104 to the OS kernel 103 in the process of the execution. In an exemplary aspect, information about the internal events can be obtained by intercepting the system calls, and also by using the OS kernel notification mechanisms and by embedding a driver of the antivirus application in the OS driver stack (for example, the file system stack or the network driver stack). The intercepting of system calls can be done by techniques known from the prior art, such as spoofing the address of a system call.

In an exemplary aspect, there are additionally entered into the first log 110 and the third log 112 records on returns from API functions, direct calls of Windows NT Native API functions and returns from Windows NT Native API functions, as well as information on events of disconnection or rebooting of the computer system.

In one exemplary aspect, each record of the first log 110 and the third log 112 on an API function call contains the following information:
  the name of the function called;
  the unique identifier (process identifier, PID) of the process launched from the file 104;
  the unique identifier (thread identifier, TID) of the thread launched from said process;
  the set of arguments of said function.

In another aspect, the arguments of the API function can be a certain pointer to a data array (such as an executable file, a dynamic link library, and so on). In this case, the pointer of such a file can be saved in a separate data log 130. In yet another exemplary aspect, the arguments of the API function can be the content of such a data array, which content will be stored in the data log 130.

In one aspect, internal events are system calls of a process launched from a file 104 to the operating system kernel for working with at least one of the following objects: network, registry, file system, RAM, and also processes and threads.

In one exemplary aspect, each record of each log 110-112 on an internal event may contain the following information:
  name of the internal event;
  type of system call;
  unique identifier of process launched from the file 104;
In another exemplary aspect, each record of each log 110-112 on an internal event additionally contains the following information:
  unique identifier of the thread launched from said process.
  unique identifier of the process of the object of the OS kernel addressed by the system call;
  unique identifier of the thread of said object of the OS kernel;
  pathway to said object of the OS kernel.

Table 1 presents examples of records on internal events. For example, the first record describes the following internal event: a process with identifier "PID" has deleted the registry key "Key".

TABLE 1

Internal events

| No | Record on internal event | Description |
| --- | --- | --- |
| 1 | <REG_DELETE_KEY PID = "PID" Status="Status"><Key>Key</Key></DELETE_KEY> | Process "PID" has deleted the registry key "Key". |
| 2 | <REG_RENAME_KEY PID="PID" Status=" Status"><Key>Key </Key><New>New </New></RENAME_KEY> | Process "PID" has changed the name of registry key "Key" to "New". |
| 3 | <DIR_CREATED PID="PID"><Name>Name </Name></DIR_CREATED> | Process "PID" has created new directory with name "Name". |
| 4 | <FILE_CREATED PID="PID"><Name>Name </Name></FILE_CREATED> | Process "PID" has created file with name "Name" |
| 5 | <PROCESS_CREATE_SUCCESS PID="PID" TID="TID" ParentPID="ParentPID" CreatedPID="CreatedPID"/> | Process with identifier "ParentPID" has created process with "PID" |

Figure 2:
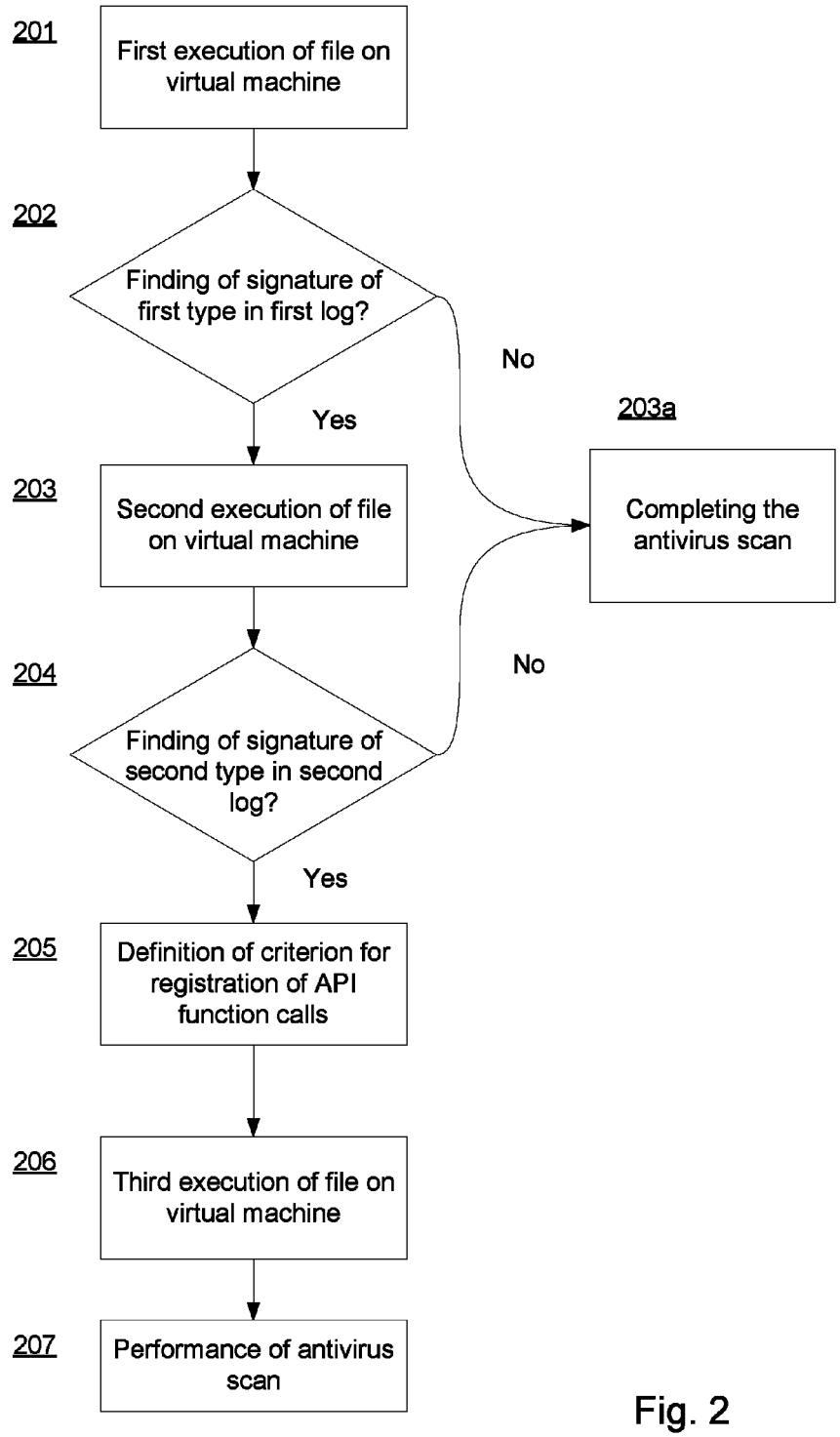
FIG. 2 illustrates a flowchart for a method of performing an antivirus scan of a file on a virtual machine according to an exemplary aspect.

FIG. 2 illustrates a flowchart for a method of performing an antivirus scan of a file on a virtual machine according to an exemplary aspect. As shown, in step 201 the antivirus application 101 executes the file 104 on the virtual machine 102. During the execution, the logging module 105 consecutively makes records of the API function calls and the internal events in the first log 110. The first log 110 contains at least one record on an API function call and at least one record on an internal event. The execution of the file 104 on the virtual machine 102 occurs until one of the events occurs: a given period of time of execution (specified for example by the administrator or the antivirus application 101) has run out, or the execution of the program code of the file 104 is completed (that is, either the last instruction of the program code has been reached, transferring control to the OS, or an error has occurred).

As discussed above, the time of execution of a file on a virtual machine may be restricted to a specified period of time. In one exemplary aspect, this period of time can be previously specified by the administrator. In another exemplary aspect, the period of time can be specified by the administrator or by the antivirus application 101 based on the statistics of the antivirus scan of other files on the virtual machine. For example, the period of time can be specified such that the probability of detecting malicious code in the file by the methods used is above a given threshold, such as 95%. That is, in this example, if malicious code in the file 104 will be detected when the file is executed on the virtual machine in an unlimited period of time, the probability of detecting the malicious code in this same file during the execution on the virtual machine 102 in a limited period of time is 95%.

In yet another exemplary aspect, the period of time can be dynamically changed during the execution of the file on the virtual machine depending on the instructions being executed by the file. For example, at the start of the file of the program code of the file there may be found a "sleep (time)" function, which halts the execution of the subsequent file code for the time "time". In this case, the period of time may be increased by the time "time".

Moreover, if the program code of the file 104 was executed before the lapsing of the specified period of time, the execution of the virtual environment 102 will also be completed.

The making of records about API function calls can be done, for example, by changing the code in the system libraries of the OS in the memory and on the disk. One can also use methods involving changing the addresses of the call for API functions from the libraries in the executable file import table and/or by putting an "interim" library in place of the original library, as a result of which the original addressing will be done to the "interim" library before passing on to the original called API function from the original library. Furthermore, the making of records on the calls of API functions can be done by tracking the execution of the program code by the processor in physical memory, as is described in U.S. Pat. No. 9,116,621, the entire contents of which are hereby incorporated by reference.

However, all existing methods to some degree or another slow down the speed of execution of the file on the virtual machine during the handling of the API function calls. For example, if the program code contains a cycle with a large number of iterations, within which cycle API function calls are found, the handling of such a cycle will take time, substantially more time, which limits the execution of the file 104 on the virtual machine 102, and the cycle will be processed in part. The presence of such a cycle testifies to the presence of a code impairing the analysis of the file, and consequently such a file may be malicious. The time for execution of cycle iterations on the virtual machine may be substantially longer (from dozens of seconds to dozens of minutes), especially when a large number of files need to be scanned. In the present invention, after discovering such cycles, a repeat running of the file on the virtual machine is done without making records on the API function calls. Therefore, the speed of execution of the file during the repeat run on the virtual machine is only slightly less than the speed of execution of the file on a real computer.

That is, in step 202 the scanning module 106, which is connected to the antivirus application 101, discovers (performs a search) in the first log 110 signatures of the first type, which are stored in the database of signatures of the first type 120. The signature (antivirus record) of first type includes not less than two records, which contain information about the API function calls. In an exemplary aspect, the signature of first type additionally contains records which in turn contain information about internal events. According to one aspect, the signature of first type contains records with information on the calls of one or more API functions which are repeated in a cycle of at least two iterations. In yet another exemplary aspect, the number of iterations of the cycle should be above a limit number of iterations specified by the administrator. The detection of a signature of first type is done by searching in the first log 110 for a match between the records of the signature of first type and the records of the first log 110. If no match was found in step 202, then the work of the method is completed in step 203a, and the file 104 will not be considered malicious.

In an exemplary aspect, the logging module 105 is implemented in the operating system 103 on the virtual machine 102. In another exemplary aspect, the antivirus application 101 is a component of the logging module 105 and is also implemented in the OS 103 on the virtual machine 102. In yet another exemplary aspect, the scanning module 106 is a component of the antivirus application 101. In another exemplary aspect, the scanning module 106 is a component of the logging module 105.

In an exemplary aspect, the signature of first type contains records of the calls of API functions responsible for network activity (such as the functions "InternetGetConnectedState" and "InternetOpenUrl").

It should be noted that the signatures may contain not only records of the logs 110-112, but also various conditions which need to be checked in order to identify the signature. The records of the logs 110-112 may contain such conditions.

For example, in an exemplary aspect, the signature of first type can additionally contain a flag indicating that the first log has no records on calls of API functions responsible for completion of a previously opened network activity (for example, no function "InternetCloseHandle"). In this example, upon detecting the signature of first type, an additional check will be done to see if the flag is equal to unity, that is, whether the aforesaid condition is met.

In an exemplary aspect, the signature of first type additionally contains a rule whereby the number of records in the first log 110 from the following list of API functions: "GetTickCount", "SysAllocString", "_wcsnicmp", "LCMapString", "wcschr", "CoTaskMemFree", "iswalpha", "iswalnum", "CompareString", "GetCurrentThreadId", "_wcsicmp", exceeds a predetermined number (for example, half of all the records in the first log 110). The aforementioned API functions are usually seldom called up by legitimate software. However, malicious software may perform a large number of calls for such functions to impede the scan by the antivirus applications.

If a signature of first type has been detected in the log 110, in step 203 there will be a repeat execution of the file 104 on the virtual machine 102. During the repeat execution, the logging module 105 will make records only about the internal events in the second log 111. The repeat execution of the file 104 on the virtual machine 102 will run until one of the events occurs: a specified execution time period has run out, or the execution of the program code of the file 104 has been completed.

As already explained above, the speed of execution of the file 104 on the virtual machine 102 in step 203 will be greater than the speed of execution of the file 104 on the virtual machine 102 in step 201. Thus, if the execution of the file 104 was interrupted upon lapsing of the given period of time, a larger number of instructions of the program code of the file 104 will have been executed in step 203 than in step 201.

It should be noted that in the majority of cases the internal events recorded in the first and second logs 110-111 in step 201 and step 203 will match up. The internal events arise as a result of the API function calls by the file 104 in the OS and characterize the behavior of the file 104 in the process of its execution.

Figure 3:
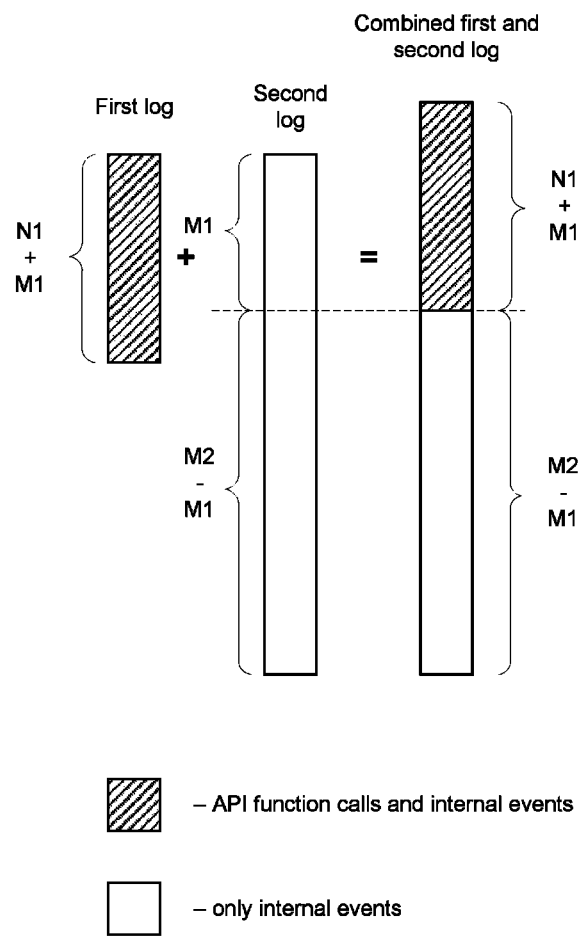
FIG. 3 shows an example of supplementing the second log with records from the first log.

FIG. 3 illustrates an example of the supplementing of the second log 111 with records from the first log 110, according to an exemplary aspect. Specifically, if the first log 110 contains N1 records on API function calls and M1 records on internal events (total of N1+M1 records), while the second log 111 contains M2 records on internal events, then M2≥M1, and all M1 records of the first log 110 match up with the first M1 records of the second log 111. Thus, the supplementing of the second log 111 can be done by replacing the first M1 records of the second log 111 with all N1+M1 records of the first log 110. In the end, the resulting number of records of the supplemented second log 111 will contain N1+M2 records, of which N1 are records on API function calls and M2 are records on internal events.

In an exemplary aspect, in step 202 the searching for a signature of first type can be done with the use of a supplemented second log, the method of producing which has been described above.

In step 204 the scanning module 106 identifies in the second log 111 a signature of second type from the database of signatures of second type 121. The signature of second type contains not less than two records on internal events.

In an exemplary aspect, the signature of second type can contain records of internal events responsible, for example, for changing the startup list through the system registry, network activity, creating new files, and also processes deleting executable files from which these processes were launched. Records on internal events usually do not allow an accurate determination of malicious files. However, analysis of internal events allows one to show with great likelihood that a file may be malicious. In order to make a final verdict, information on the API function calls is also needed.

Thus, if in step 204 none of signature of second type is found, the file 104 will be considered not malicious, and the method is completed in step 203a. Otherwise, the method will be continued, and it will be necessary to perform a third execution of the file 104 on the virtual machine 102. In the process of the third execution of the file 104 at first only records on internal events will be made, and then when certain conditions (criteria) occur there will also be made records on the API function calls, which will enable a more accurate determination of whether the file 104 is malicious.

For this, in step 205 the antivirus application 101 determines criteria for making records on the API function calls on the basis of the second log 111 and the first log 110. For example, a criterion for making records on API function calls might be the following condition: the occurrence of an internal event with record sequence number in the second log 111, which record is found in the second log 111 before the first record of the identified signature of second type. In yet another example, criteria for making records on API function calls could be the making of records on API function calls after detection of signatures of second type in the second log 111 and first log 110.

In step 206 the antivirus application 101 will perform a third execution of the file 104 on the virtual machine 102, and during the execution of the file 104 the logging module 105 will make an entry in the third log 112 of records only on internal events until such time as the conditions are fulfilled for the criterion of making records on the API function calls, after which records on the API function calls begin to be entered in the third log 112. Also, as in steps 201 and 203, the execution of the file 104 in step 206 occurs until one of the events takes place: the specified time period of execution runs out, or the execution of the program code of the file 104 is completed.

As a result, in step 207 the scanning module 106 performs an antivirus scan of the file 104 by identifying in the third log 112 a malicious signature with the use of the database of malicious signatures 122. Each malicious signature contains at least one record containing in turn at least information about API function calls or internal events. The file will be considered malicious when the mentioned signature is found at least in the third log.

By suspicious activity in the context of the present invention is meant events obtained with the help of the antivirus application 101 on the basis of the records of the logs 110-112 as to API function calls and internal events. That is, suspicious activities define actions which are performed as a result of the calling of the respective API functions contained in the first log 110.

FIG. 6 illustrates Table 2, which presents examples of suspicious activities. As shown, for example, the first entry in table 2 contains information on the suspicious activity auto run, containing the following fields: unique process identifier (PID); unique thread identifier (TID); name of the registry key (registry_key); pathway to the file which has been added to autostart (Target_file); pathway to the file from which the process carrying out the action was launched (Image_path). This suspicious activity describes a process launched from "image_path", which added the file "Target_file" to autostart (registry key "registry_key"). A specific example of such suspicious activity is presented in table 2. In an exemplary aspect, the signature of second type additionally contains records on suspicious activities.

Table 3 (shown below) illustrates examples of malicious signatures. A malicious signature is needed in order to determine whether an investigated file 104 is malicious. In an exemplary aspect, the structure of the signature may contain records of signatures, rules applicable to the given records, and a search region (one or more logs in which the search for the given signature will take place), in which the search for the given signature will take place. The records of the signatures may contain both specific API function calls or specific internal events, and partial information about API function calls or internal events. For example, the signature records may contain regular expressions. Thus, in record A) the character "?" means that any given character can stand in place of the question mark in the record.

For example, the search for the first signature will be done in the third log 112. For this aspect, the scanning module 106 will search in the third log 112 for records of the signature A) to D) and, if they are all contained in the third log 112 according to the rule of the signature the file 104 will be considered malicious. Thus, record A) means copying of itself by the process. Record B) will be found when there is found in the log a call of an API function whose argument contains the string ".exe/**installservice". Record C) has an analogous meaning. Record D) means that the log should contain the API function call "DeleteFile ("$selfpath\\$selfname.exe")", where "$selfpath" is the path to the file, and "$selfname.exe" is the name of the file.

The second signature in table 3 contains the same records as the first signature, but the rule is more broad—the combined log should contain at least any three records A) to D). The combined log is obtained by combining the records of the three logs 110-112 and will be described in further detail below.

TABLE 3

Examples of malicious signatures

| No | Signature records | Rules | Search region |
|----|-------------------|-------|---------------|
| 1 | A) <<CopyFile? (????????  "$selfpath\\$selfname.exe",???????? "$windir\\$system32\\>> B) <<.exe /**installservice>> | -> The log contains all the following | Third log |

TABLE 3-continued

Examples of malicious signatures

| No | Signature records | Rules | Search region |
|----|-------------------|-------|---------------|
|  | C) <<}\\LocalServer32"},???????? "(NILL)",????????,???????? -> REG_SZ, ???????? "$selfpath\\$selfname.exe">> D) <<DeleteFile? (???????? "$selfpath\\$selfname.exe")>> | -> records A) to D) -> -> | |
| 2 | A) <<CopyFile? (???????? "$selfpath\\$selfname.exe",???????? "$windir\\$system32\\>> B) <<.exe /**installservice>> C) <<}\\LocalServer32"},???????? "(NILL)",????????,???????? -> REG_SZ, ???????? "$selfpath\\$selfname.exe">> D) <<DeleteFile? (???????? | -> -> -> -> | The log contains at least any three records from A) to D) | Combined log |

As was explained above, during each execution of the file 104 on the virtual machine 102 the internal events being entered into any one of the logs 110-112 will be the same, regardless of the entering of records about the API function calls. Thus, in an exemplary aspect, all three logs 110-112 can be combined to obtain the most complete information about the execution of the file on the virtual machine and in step 207 the antivirus scan of the file will be performed by finding a malicious signature in the combined log.

In an exemplary aspect, in step 207 an antivirus scan is performed in addition on data arrays stored in the data log 130. This antivirus scan can be done with the use of signature analysis, heuristic analysis, or other known methods of antivirus scanning of files.

In an exemplary aspect, in step 201 the first memory dump of the operating system after completing the execution of the file 104 on the virtual machine 102 is saved with the help of the antivirus application 101. In step 203, the second memory dump of the OS after completing the execution of the file 104 on the virtual machine 102 is saved with the help of the antivirus application 101. In step 206, the third memory dump of the OS after completing the execution of the file 104 on the virtual machine 102 is saved.

In an exemplary aspect, in step 207 the performance of the antivirus scan of the file can be done in addition by finding malicious signatures in one or more of the saved OS memory dumps, while in a given example the malicious signatures will contain records from one or more OS memory dumps.

In another exemplary aspect, in step 207 the performance of the antivirus scan of the file can be done simply by finding malicious signatures in one or more of the saved OS memory dumps, while in a given example the malicious signatures contain strings from the OS memory dump. Table 4 below presents examples of malicious signatures making use of the memory dump and the logs 110-112.

TABLE 4

Examples of Malicious Signatures

| No | Malicious signature | Source |
|----|---------------------|--------|
| 1 | The third memory dump contains all the following strings: "HTTPFlooder", "How many threads that are", "frmMain_Load", "<cmdAttack_Click>" | Memory dump |
| 2 | The third memory dump contains all the following strings: <</vztech.org/update/ver.dat>>, <<Crypter>>, | Memory dump |

TABLE 4-continued

Examples of Malicious Signatures

| No | Malicious signature | Source |
|---|---|---|
|  | <<Dosya>>, while the third log contains the API function call CreateWindowExW (00000000,'? ?[8]'-> \WindowsForms'*[30]'\","? ? [8]'-> \"VZTech\\\\"\". | and log |

Figure 4:
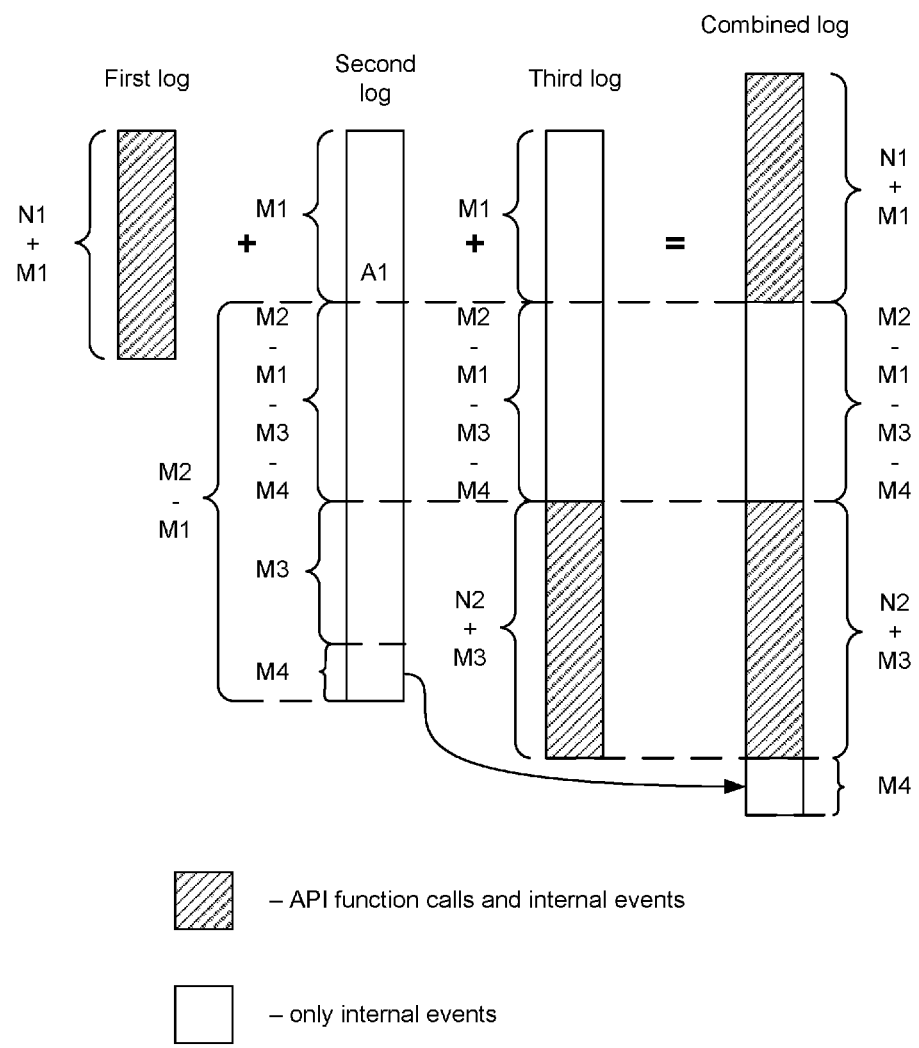
FIG. 4 shows an example of the combining of the three logs.

FIG. 4 presents an example of the combination of the three logs. For example, the first log 110 may contain N1 records on API function calls and M1 records on internal events (total of N1+M1 records). Moreover, the second log 111 may contain a total of M2 records on internal events (M2≥M1), and all M1 records of the first log 110 match up with the first M1 records of the second log 111, and also with the first M1 records of the third log 112. As such, the combined log is obtained by replacing these M1 records in the third log 112 with the N1+M1 records on the API function calls and on the internal events of the first log 110.

At the end, the third log 112 contains N2 records on the API function calls and M3 records on internal events (a total of N2+M3 records). The given M3 records on internal events correspond to the M3 records on internal events in the second log 111. The second log 111 after the M3 records can contain yet another number of records on internal events, which will be added at the end of the combined log.

Thus, at the start the combined log contains N1+M1 records on the API function calls and internal events, next come M2-M1-M3-M4 records only on internal events, and then N2+M3 records on API function calls and internal events, and at the end M4 records on internal events.

Figure 5:
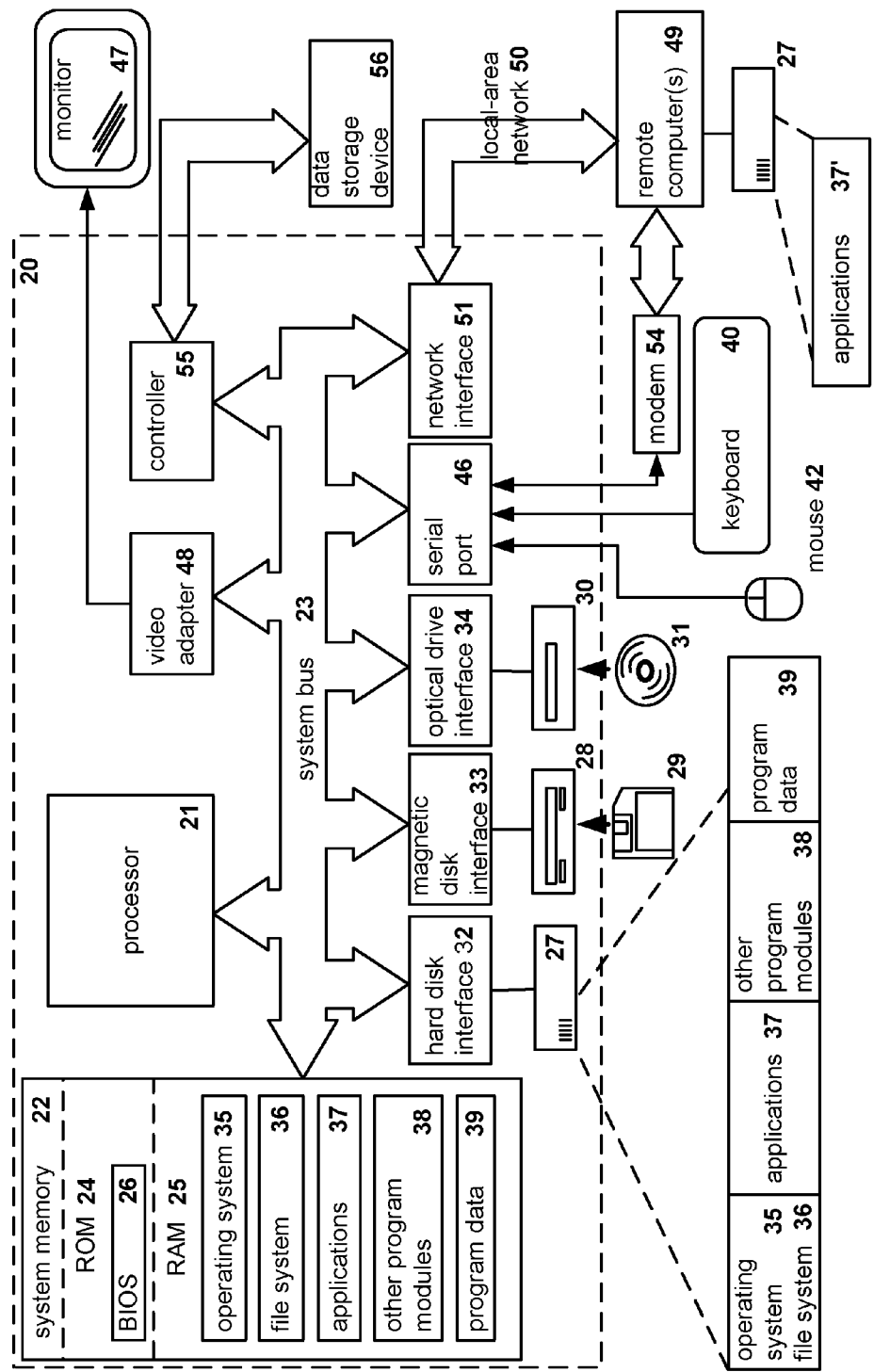
FIG. 5 illustrates an example of a general-purpose computer system on which the disclosed systems and method can be implemented.

FIG. 5 illustrates an example of a general-purpose computer system (which may be a personal computer or a server) on which the disclosed systems and method can be implemented according to an example aspect. For example, the computer system 20 can correspond to one or more of protections servers 120 or thin clients 110. As shown, the computer system 20 may include a central processing unit 21 (although not for the thin client 110), a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

As noted above, in various aspects, the systems and methods described in the present disclosure in terms of modules. It is reiterates that the term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing an antivirus scan of a file on a virtual machine, the method comprising:
performing a first execution of the file on the virtual machine;
recording, in memory, a first log that includes at least one application programming interface (API) function call and at least one internal event comprising at least one system call of a process launched from the file to an operating system kernel detected during the first execution of the file;
determining if any signatures from a first database of signatures are detected in the first log;
responsive to determining that at least one signature from the first database of signatures is detected in the first log, performing a second execution of the file on the virtual machine and recording, in the memory, a second log that includes at least one internal event detected during the second execution of the file, wherein the second log does not include API function calls occurring during the second execution of the file;
determining if any signatures from a second database of signatures are detected in the second log;
responsive to determining that at least one signature from the second database of signatures is detected in the second log, generating a combined log associated with the file based on at least the first log and the second log, wherein one or more records of internal events in the second log are replaced with a plurality of records of corresponding internal events and at least one API function call in the first log; and
classifying the file as malicious in response to detection of a malicious signature in the combined log associated with the file.

2. The method according to claim 1, further comprising:
if at least one signature from the second database of signatures is detected in the second log, determining criteria to make records on API function calls based on the first log and the second log;
performing a third execution of the file on the virtual machine;
recording, in the memory, a third log that includes at least one internal event detected during the third execution of the file and does not include API function calls occurring during the third execution until conditions for the determined criteria are fulfilled;
in response to detecting the conditions for the determined criteria have been fulfilled, recording in the third log records about API function calls detected during the third execution of the file;
modifying the combined log associated with the file based on at least the third log; and
responsive to determining no signatures from a database of malicious signatures is detected in the combined log, classifying the file as not malicious.

3. The method according to claim 2, wherein the criteria to make records on API function calls comprises at least one of: making records on API function calls in response to detecting an internal event with a record sequence number in the second log for a record exists in the second log prior to a first record of the at least one signature in the second database of signatures, and making records on API function calls after detection of signatures in the first log and the second log in the second database of signatures.

4. The method according to claim 1, wherein the performing of the first execution of the file on the virtual machine comprises performing the first execution restricted to a specified period of time.

5. The method according to claim 4, further comprising dynamically changing the period of time during the first execution of the file on the virtual machine depending on instructions being executed by the file.

6. The method according to claim 1, wherein each of the at least one internal events stored in the first log and the second log are matched up to generate the combined log using at least one of a name of the internal event, a type of system call, a unique identifier of a process launched from the file; and unique identifier of a thread launched from the process, a unique identifier of the process of an object of an operating system (OS) kernel addressed by the system call, a unique identifier of a thread of the object of the OS kernel, and a pathway to the object of the OS kernel.

7. A system for performing an antivirus scan of a file on a virtual machine, the system comprising:

a first database of signatures;
a second database of signatures;
memory; and
a processor configured to:
  perform a first execution of the file on the virtual machine,
  store, in memory, a first log that includes at least one application programming interface (API) function call and at least one internal event comprising at least one system call of a process launched from the file to an operating system kernel detected during the first execution of the file,
  determine if any signatures from the first database of signatures are detected in the first log,
  responsive to determining that at least one signature from the first database of signatures is detected in the first log, perform a second execution of the file on the virtual machine and store, in the memory, a second log that includes at least one internal event detected during the second execution of the file, wherein the second log does not include API function calls occurring during the second execution of the file;
  determine if any signatures from the second database of signatures are detected in the second log;
  responsive to determining that at least one signature from the second database of signatures is detected in the second log, generate a combined log associated with the file based on at least the first log and the second log, wherein one or more records of internal events in the second log are replaced with a plurality of records of corresponding internal events and at least one API function call in the first log; and
  classify the file as malicious in response to detection of a malicious signature in the combined log associated with the file.

8. The system according to claim 7, wherein the processor is further configured to:
  determine criteria to make records on API function calls based on the first log and the second log if at least one signature from the second database of signatures is detected in the second log,
  perform a third execution of the file on the virtual machine,
  store, in the memory, a third log that includes at least one internal event detected during the third execution of the file and does not include API function calls occurring during the third execution until conditions for the determined criteria are fulfilled;
  in response to detecting the conditions for the determined criteria have been fulfilled, store in the third log records about API function calls detected during the third execution of the file;
  modifying the combined log associated with the file based on at least the third log; and
  responsive to determining no signatures from a database of malicious signatures is detected in the combined log, classify the file as not malicious.

9. The system according to claim 8, wherein the criteria to make records on API function calls comprises at least one of: making records on API function calls in response to detecting an internal event with a record sequence number in the second log for a record exists in the second log prior to a first record of the at least one signature in the second database of signatures, and making records on API function calls after detection of signatures in the first log and the second log in the second database of signatures.

10. The system according to claim 7, wherein the processor is further configured to perform the first execution of the file on the virtual machine by performing the first execution restricted to a specified period of time.

11. The system according to claim 10, wherein the processor is further configured to dynamically change the period of time during the first execution of the file on the virtual machine depending on instructions being executed by the file.

12. The system according to claim 7, wherein each of the at least one internal events stored in the first log and the second log are matched up to generate the combined log using at least one of a name of the internal event, a type of system call, a unique identifier of a process launched from the file; and unique identifier of a thread launched from the process, a unique identifier of the process of an object of an operating system (OS) kernel addressed by the system call, a unique identifier of a thread of the object of the OS kernel, and a pathway to the object of the OS kernel.

13. A non-transitory computer readable medium storing computer executable instructions for performing an antivirus scan of a file on a virtual machine, including instructions for:
  performing a first execution of the file on the virtual machine;
  recording, in memory, a first log that includes at least one application programming interface (API) function call and at least one internal event comprising at least one system call of a process launched from the file to an operating system kernel detected during the first execution of the file;
  determining if any signatures from a first database of signatures are detected in the first log;
  responsive to determining that at least one signature from the first database of signatures is detected in the first log, performing a second execution of the file on the virtual machine and recording, in the memory, a second log that includes at least one internal event detected during the second execution of the file, wherein the second log does not include API function calls occurring during the second execution of the file;
  determining if any signatures from a second database of signatures are detected in the second log;
  responsive to determining that at least one signature from the second database of signatures is detected in the second log, generating a combined log associated with the file based on at least the first log and the second log, wherein one or more records of internal events in the second log are replaced with a plurality of records of corresponding internal events and at least one API function call in the first log; and
  classifying the file as malicious in response to detection of a malicious signature in the combined log associated with the file.

14. The non-transitory computer readable medium of claim 13, further comprising instructions for:
  determining criteria to make records on API function calls based on the first log and the second log if at least one signature from the second database of signatures is detected in the second log;
  performing a third execution of the file on the virtual machine;
  recording, in the memory, a third log that includes at least one internal event detected during the third execution of the file and does not include API function calls occurring during the third execution until conditions for the determined criteria are fulfilled;

in response to detecting the conditions for the determined criteria have been fulfilled, recording in the third log records about API function calls detected during the third execution of the file;

modifying the combined log associated with the file based on at least the third log; and responsive to determining no signatures from a database of malicious signatures is detected in the combined log, classifying the file as not malicious.

15. The non-transitory computer readable medium of claim 14, wherein the criteria to make records on API function calls comprises at least one of: making records on API function calls in response to detecting an internal event with a record sequence number in the second log for a record exists in the second log prior to a first record of the at least one signature in the second database of signatures, and making records on API function calls after detection of signatures in the first log and the second log in the second database of signatures.

16. The non-transitory computer readable medium of claim 13, further comprising instructions for performing the first execution of the file on the virtual machine by performing the first execution restricted to a specified period of time.

17. The non-transitory computer readable medium of claim 16, further comprising instructions for dynamically changing the period of time during the first execution of the file on the virtual machine depending on instructions being executed by the file.

18. The non-transitory computer readable medium of claim 13, wherein each of the at least one internal events stored in the first log and the second log are matched up to generate the combined log using at least one of a name of the internal event, a type of system call, a unique identifier of a process launched from the file; and unique identifier of a thread launched from the process, a unique identifier of the process of an object of an operating system (OS) kernel addressed by the system call, a unique identifier of a thread of the object of the OS kernel, and a pathway to the object of the OS kernel.

19. The method of claim 1, further comprising:
if no signatures from the first database of signatures are detected in the first log, classifying the file as not malicious; and
if no signatures from the second database of signatures are detected in the second log, classifying the file as not malicious.

20. The method of claim 1, wherein speed of the second execution of the file is greater than the speed of the first execution of the file.

21. The method of claim 1, wherein the at least one signature from the first database of signature specifies calls of the least one API function call repeated in a cycle of more than a predetermined limit number of iterations.

\* \* \* \* \*